April 28, 1959 W. H. HANNAHS 2,884,571

PRINTED CIRCUIT

Filed July 12, 1952

INVENTOR
WILSON H. HANNAHS
BY
F. Kumpf Jr.
ATTORNEY

United States Patent Office 2,884,571

Patented Apr. 28, 1959

2,884,571

PRINTED CIRCUIT

Wilson H. Hannahs, Pleasantville, N.Y., assignor to Sylvania Electric Products Inc., a corporation of Massachusetts Application July 12, 1952, Serial No. 298,599

4 Claims. (Cl. 317—101)

This invention relates to a printed circuit and method for making the same. More particularly, it relates to an electro-formed circuit of this type.

Many methods have been developed in recent years for making the so-called printed circuit which are now extensively used in the electronic industry. The circuits are in many ways superior to those of the prior art particularly in view of the fact that the circuit as "printed" may include elements such as inductors, resistors, capacitors, terminal areas and labels. The method of manufacture is such that it is possible to obtain a finished product at a considerable cost saving. The most common methods of making such circuit have relied on an etching technique in which metal clad rigid dielectrics have been selectively coated with an acid resist in a desired design according to a given pattern and then been etched to remove the metal from the undesired areas. Processes of similar types have also been developed using metal foil clad flexible dielectrics. Processes have also been developed in accordance with which circuits are electro-formed on predetermined areas of polished steel plates stripped therefrom and cemented to a dielectric backing material.

Although the printed process circuits of the prior art have proven themselves to be more economical than the previous methods they have not been wholly without disadvantages. In the etching process mentioned a considerable amount of metal is thrown away and the electroforming process heretofore used has been cumbersome in requiring a molding and pressing step by means of which the electro-formed circuit is affixed onto the dielectric backing material.

It is therefore an object of this invention to provide a method of manufacturing a printed circuit in which none of the metal used in its manufacture is lost.

It is a further object of this invention to provide a method which will permit rapid and cheap design changes.

It is a still further object of this invention to provide a method which will eliminate the step of molding and pressing the printed circuit onto a dielectric backing material.

In accordance with this invention it has been found that it is possible to manufacture printed circuits in a manner which will satisfy the above objectives by electro-forming the printed circuit directly in the interstices of a porous material.

The method of making the printed circuit of this invention consists essentially of electro-forming the circuit in the interstices or pores of a porous material selected areas of which have been impregnated with a stop-off material.

There are many ways in which the process of this invention might be carried out. It is conceivable that it would be possible to print the desired stop-off pattern onto the porous material on which the electro-formed circuit is to be formed, dry the print and store the material for a considerable time before introducing it into the bath in which the electro-forming operation is to take place. Since the material itself is non-conductive it is naturally essential that some means be provided for causing the metal to be deposited within the pores of the material. This can be accomplished by placing the material immediately adjacent to a metallic surface which is also immersed in the electro-forming bath simultaneously with the porous material.

To obtain best results it has been found preferable to impregnate the porous material with the stop-off design while it is positioned adjacent to the metal along with which it is to be introduced into the electro-forming bath. This metal is preferably made of a material which can take a high polish such as stainless steel. When the stop-off material is printed onto the cloth in this manner it strikes through to the stainless steel sheet and thereby forms the design on both the sheet and the cloth. Thereupon when the two are immersed into the electro-forming bath the metal to be deposited forms on the highly polished sheet and builds up on out through the pores of the material forming about the individual fibers thereof and thus securely anchoring itself thereto. The porous material can then be stripped off of the metallic member taking with it the electro-formed circuit.

Figure 1:
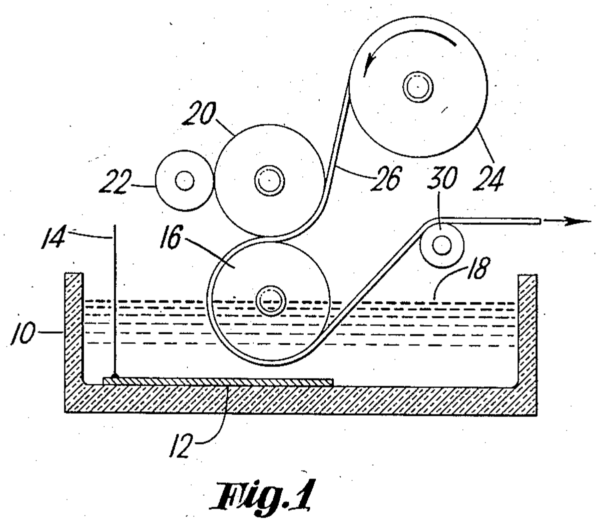
Figure 1 is a schematic illustration of a method of electro-forming a printed circuit in accordance with this invention.

In the drawings Figure 1 illustrates a piece of apparatus by means of which this process can be carried out in a continuous manner.

10 represents a tank for an electro-forming bath which is made of a dielectric material. 12 represents an anode which is positioned at the bottom of the tank and connected to a current source not shown by means of a suitably insulated lead 14. The cathode 16 is a cylindrical member preferably having a stainless steel surface and is partially immersed in the electro-forming solution 18. The top surface of the cathode 16 is in pressure contact with a printing cylinder 20. Mounted directly above this printing cylinder is an inking roller 22. When a device of this type is used the material onto which the electro-formed circuit is to be formed is held on a reel such as shown at 24 which is adapted to supply the material 26 to the printing roller and permit the stop-off material to be printed thereon and through to the surface of the cathode 16. As the material passes between the rollers 20 and 16 it is held securely against the surface of the cathode 16 and then passes through the electro-forming bath 18 wherein the current conditions are such that a metallic circuit is electro-formed within the porous portion of the material 20 in those places where the stop-off ink is not present. The material then leaves the tank 10 and passes over an idler 30 to washing and drying baths not shown.

Figure 2:
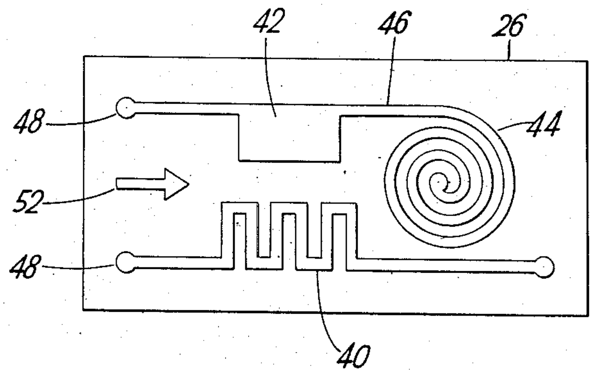
Figure 2 is a plan view showing an electro-formed printed circuit made in accordance with the concept of this invention.

An illustration of the type of circuit patterns which can be formed on the porous material is indicated in Figure 2 in which the material 20 is shown with various circuit elements resistor 40, capacitor 42, inductor 44, connectors 46, terminals 48, name plate 50 and label 52 as illustrative embodiments formed in the pores of the material.

When material containing the circuit has been stripped from the cathode, cleaned and dried it may be further impregnated with varnishes if so desired and although it is not essential and often times undesirable the material could be affixed to a rigid dielectric.

The porous material may naturally be made of any number of dielectric materials some of which may be listed as follows: silk, cotton gauze, cotton organdy, nylon and some of the new synthetic fibers such as orlon. Furthermore, it may even be made of a less substantial material such as filter paper. Any porous dielectric material might be suitable for such use.

The stop-off materials which can be used for the purpose of printing on to the material in those areas in which it is desired to leave free of conductive material can naturally be selected from those materials well known in the electro-forming art as, for example, vinyl resin lacquers, ethyl cellulose, cellulose acetate adhesives, furane resin formulations, asphalt varnishes, etc. For best results it is, however, preferable to use a material which has good dielectric properties and high thermal stability.

While the above description and drawings submitted herewith disclose a preferred and practical embodiment of the printed circuit of this invention it will be understood that the specific details of construction and arrangement of parts as shown and described are given by way of illustration and are not to be construed as limiting the scope of the invention.

What is claimed is:

1. A printed circuit comprising a porous electric insulator body, certain selected pores being impregnated with an electrically non-conductive stop-off material, the unselected pores being impregnated with an electrically conductive material to define said circuit.

2. A printed circuit comprising a porous electrically non-conductive body having a high dielectric constant, the pores contained in selected portions of said body being impregnated with a thermally stable electrically non-conductive stop-off material also having a high dielectric constant, the pores contained in the unselected portions of said body being impregnated with an electrically conductive metallic material to define said circuit.

3. A method for forming a printed circuit in a porous electric insulator body having at least two opposite exposed surfaces, said circuit being defined by a pattern of metallic material which is contained within selected pores of said body, said method comprising the steps of impregnating the unselected pores of said body with an electrically non-conductive stop-off material; placing one of said body surfaces in intimate contact with one surface of an electrically conductive member; and electrolytically depositing said metallic material through the other of said body surfaces and through the selected pores of said body onto said one member surface, said deposition continuing until the deposited metal impregnates said selected pores.

4. The method as set forth in claim 3 further including the steps of stripping said impregnated body from said electrically conductive member.

References Cited in the file of this patent

UNITED STATES PATENTS

| | | |
|---|---|---|
| 1,647,474 | Seymour | Nov. 1, 1927 |
| 1,916,947 | Haendel | July 4, 1933 |
| 2,042,030 | Tainton | May 26, 1936 |
| 2,241,735 | Prest | June 3, 1947 |
| 2,441,960 | Eisler | May 25, 1948 |
| 2,582,685 | Eisler | Jan. 15, 1952 |
| 2,641,675 | Hannahs | June 9, 1953 |

FOREIGN PATENTS

| | | |
|---|---|---|
| 9,982 | Great Britain | 1843 |
| 5,516 | Great Britain | 1901 |
| 176,017 | Switzerland | June 17, 1935 |